United States Patent
Yaguchi et al.

(10) Patent No.: US 7,730,723 B2
(45) Date of Patent: Jun. 8, 2010

(54) EXHAUST HEAT RECOVERY APPARATUS

(75) Inventors: Hiroshi Yaguchi, Susono (JP); Daisaku Sawada, Gotenba (JP); Shinichi Mitani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 479 days.

(21) Appl. No.: 11/727,828

(22) Filed: Mar. 28, 2007

(65) Prior Publication Data

US 2007/0227144 A1   Oct. 4, 2007

(30) Foreign Application Priority Data

Mar. 30, 2006   (JP)   ............... 2006-095733

(51) Int. Cl.
F02G 5/04 (2006.01)
F02G 3/00 (2006.01)
F02G 5/02 (2006.01)
F02G 1/043 (2006.01)
F02G 1/053 (2006.01)
F02G 1/06 (2006.01)
F02B 41/10 (2006.01)

(52) U.S. Cl. .............. 60/597; 60/616; 60/670
(58) Field of Classification Search ............... 60/597, 60/616, 618; F02G 5/04, 5/02, 1/043, 1/053, F02G 1/06; F02B 41/00, 5/02; F02C 6/16; F01N 5/02
See application file for complete search history.

(56) References Cited

U.S. PATENT DOCUMENTS

| | | | | |
|---|---|---|---|---|
| 5,146,750 | A | 9/1992 | Moscrip | 60/517 |
| 6,543,229 | B2 | 4/2003 | Johansson | 60/517 |
| 6,651,433 | B1 | 11/2003 | George, Jr. | 60/618 |
| 6,725,662 | B2 * | 4/2004 | Baba et al. | 60/670 |
| 7,181,912 | B2 * | 2/2007 | Mori | 60/616 |
| 2005/0194940 | A1 | 9/2005 | Aldridge et al. | |
| 2009/0031724 | A1 * | 2/2009 | Ruiz | 60/618 |

FOREIGN PATENT DOCUMENTS

DE   3330315 A1 *   3/1985

(Continued)

OTHER PUBLICATIONS

International Search Report dated Jul. 5, 2007.

(Continued)

*Primary Examiner*—Thai Ba Trieu
(74) *Attorney, Agent, or Firm*—Finnegan, Henderson, Farabow, Garrett & Dunner, LLP

(57) ABSTRACT

An exhaust heat recovery apparatus includes: an exhaust heat recovery unit that produces motive power by recovering thermal energy from exhaust gas discharged from a heat engine; an electric generator that is driven by the exhaust heat recovery unit; a first power transmission-switching device that switches between connection and disconnection between the heat engine and the exhaust heat recovery unit; and a second power transmission-switching device that switches between connection and disconnection between the exhaust heat recovery unit and the electric generator, wherein the heat engine or the electric generator is selectively connected to the exhaust heat recovery unit, depending on the operational status of the heat engine. The exhaust heat recovery apparatus makes it possible to effectively use surplus motive power produced by an exhaust heat recovery unit.

9 Claims, 6 Drawing Sheets

FOREIGN PATENT DOCUMENTS

| | | | |
|---|---|---|---|
| DE | 10143342 A1 * | 4/2003 |
| DE | 10355563 A1 * | 6/2005 |
| EP | 1 243 758 A1 | 9/2002 |
| JP | 02 157423 | 6/1990 |
| JP | 05-038956 | 2/1993 |
| JP | 2000345915 A * | 12/2000 |
| JP | 2003-518458 | 6/2003 |
| JP | 2004-332665 | 11/2004 |
| JP | 2005-090376 | 4/2005 |
| JP | 2005-113719 | 4/2005 |
| JP | 56120499 A * | 12/2006 |
| JP | 2007231857 A * | 9/2007 |
| JP | 2007231858 A * | 9/2007 |
| JP | 2007239661 A * | 9/2007 |
| JP | 2008051062 A * | 3/2008 |
| WO | WO 90/09515 | 8/1990 |

OTHER PUBLICATIONS

Office Action dated Jan. 22, 2010 for U.S. Appl. No. 11/715,470, filed Mar. 8, 2007.

* cited by examiner

EXHAUST HEAT RECOVERY APPARATUS

INCORPORATION BY REFERENCE

The disclosure of Japanese Patent Application No. 2006-095733 filed on Mar. 30, 2006 including the specification, drawings and abstract is incorporated herein by reference in its entirety.

BACKGROUND OF THE INVENTION

1. Field of the Invention

The present invention relates to an exhaust heat recovery apparatus that recovers thermal energy from the exhaust gas of an internal combustion engine, factory exhaust heat, or the like to produce motive power.

2. Description of the Related Art

An exhaust heat recovery apparatus is available that, using a heat engine, recovers the exhaust heat from an internal combustion engine that is mounted on a vehicle, such as a passenger car, a bus and a truck. In the exhaust heat recovery apparatus used for such a purpose, an external combustion engine is used, such as the Stirling engine, which is excellent in theoretical thermal efficiency, for example.

Published Japanese Translation of PCT application No. 2003-518458 (JP-T-2003-518458) discloses a technology in which a clutch is provided between the internal combustion engine and the Stirling engine, and the Stirling engine is used as an additional drive unit of the internal combustion engine. In addition, Japanese Patent Application Publication No. 2004-332665 (JP-A-2004-332665) discloses a technology concerning a system that includes a combustion engine, an electric generator, a motor, and a Stirling engine for driving the electric generator, wherein the electric power generated by the electric generator is supplied to the motor and a battery, and the electric generator is driven by the motor, wherein, a clutch is provided between the electric generator and the combustion engine, and the electric generator is driven by the combustion engine or the motor in a selective manner using the clutch.

In external combustion engines, such as the Stirling engine, the heat input from a heat source, such as the exhaust gas, is transferred to the working fluid of the external combustion engine through a heat exchanger, and the output from external combustion engines is therefore less responsive to the variation of the heat input. In addition, external combustion engines, such as the Stirling engine, which obtain thermal energy from a heat source through a heater, sometimes continue to produce motive power even after the heat input is stopped, by virtue of the heat stored in the heater.

As a result, if an external combustion engine, such as the Stirling engine, is used as the exhaust heat recovery unit, the exhaust heat recovery unit sometimes continues to produce motive power by virtue of the heat stored in the heater that the exhaust heat recovery unit includes, even when exhaust heat is not supplied to the exhaust heat recovery unit. In such a case, in the case of the configuration in which the output from the exhaust heat recovery unit and the output from the heat engine are combined and output together, the exhaust heat recovery unit produces surplus motive power even when there is no request to drive the heat engine. In JP-T-2003-518458, the poorness of the output response when an external combustion engine, such as the Stirling engine, is used as the exhaust heat recovery unit is not considered, and there is yet room for improvement.

In the meantime, with regard to the technology disclosed by JP-T-2003-518458, the configuration is adopted in which an electric generator is always interposed. When the thermal energy recovered by the exhaust heat recovery unit is output as electric energy, the energy conversion efficiency of electric generators and batteries is less than 100%. Thus, if the technology disclosed by the JP-T-2003-518458 is used, the thermal energy recovered by the exhaust heat recovery unit declines.

SUMMARY OF THE INVENTION

The present invention has been made in consideration of the above problems, and provides, as an aspect, an exhaust heat recovery apparatus that makes it possible to effectively use surplus motive power produced by an exhaust heat recovery unit when the output from the exhaust heat recovery unit and the output from the heat engine are combined and output together.

Thus, provided is an exhaust heat recovery apparatus that includes: an exhaust heat recovery unit that produces motive power by recovering thermal energy from exhaust gas discharged from a heat engine; an electric generator that is driven by the exhaust heat recovery unit; a first power transmission-switching device that switches between connection and disconnection between the heat engine and the exhaust heat recovery unit; and a second power transmission-switching device that switches between connection and disconnection between the exhaust heat recovery unit and the electric generator, wherein the heat engine or the electric generator is selectively connected to the exhaust heat recovery unit, depending on operational status of the heat engine.

In the exhaust heat recovery apparatus as described above, the output from the exhaust heat recovery unit and the output from the heat engine are combined. In addition, the exhaust heat recovery apparatus includes an electric generator driven by the exhaust heat recovery unit. Using the first and second power transmission-switching devices, the heat engine or the electric generator is selected and connected to the exhaust heat recovery unit, depending on the operational status of the heat engine. In this way, after it becomes possible for the exhaust heat recovery unit to operate in a self-sustaining manner, it is possible either to output the motive power produced by the exhaust heat recovery unit together with the motive power produced by the heat engine, or to convert the motive power produced by the exhaust heat recovery unit into electric energy and then output the power, depending on the operational status of the heat engine. Thus, even when the exhaust heat recovery unit produces surplus motive power, it is possible to effectively use the surplus motive power by converting the surplus motive power into electric energy.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. It should be noted that the present invention is not limited to the preferred embodiments (hereinafter referred to merely as "the embodiment(s)") for carrying out the invention. The components of the embodiments include ones that those skilled in the art would easily think of, and ones that are substantially the same as the former ones. The description given below illustrates a case where a Stirling engine is used as an exhaust heat recovery unit to recover thermal energy from the exhaust gas from an internal combustion engine, which functions as a heat engine. In addition to the Stirling engine, another exhaust heat recovery device, such as one using the Brayton cycle, may be used as the exhaust heat recovery unit. The type of heat engine is arbitrary.

A first embodiment of the present invention will be described first. The first embodiment is characterized in the following points. Specifically, the output from the exhaust heat recovery unit and the output from the heat engine are combined and output from a common shaft, and an electric generator driven by the exhaust heat recovery unit is provided. In addition, a first power transmission-switching device is provided between the heat engine and the exhaust heat recovery unit, the same first power transmission-switching device being provided between the heat engine and the electric generator. A second power transmission-switching device is provided between the electric generator and the exhaust heat recovery unit. The first power transmission-switching device and the second power transmission-switching device are used to selectively connect the exhaust heat recovery unit to the heat engine or the electric generator depending on the operational status of the heat engine (such as in an accelerating state, in a decelerating state, in a steady state, and in a stopped state). A configuration of the exhaust heat recovery unit of the first embodiment will be described below.

Figure 1:
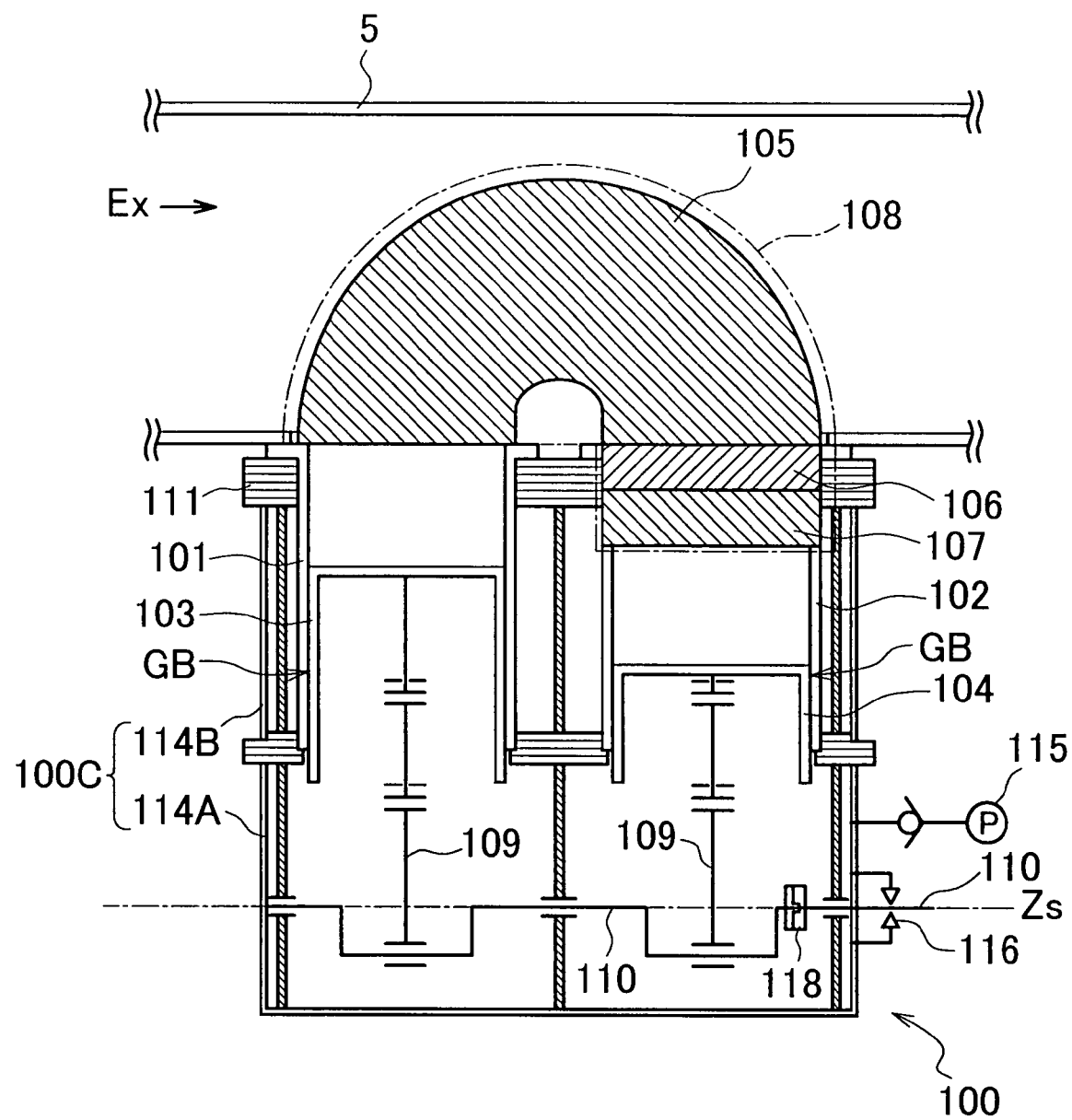
FIG. 1 is a sectional view showing a Stirling engine, which functions as an exhaust heat recovery unit of a first embodiment.

FIG. 1 is a sectional view showing the Stirling engine, which functions as the exhaust heat recovery unit of the first embodiment. The Stirling engine 100, which functions as the exhaust heat recovery unit of the first embodiment, is a so-called a-type in-line two-cylinder Stirling engine. In the Stirling engine 100, arranged in an in-line arrangement are: a high temperature-side piston 103, which is a first piston, housed in a high temperature-side cylinder 101, which is a first cylinder; and a low temperature-side piston 104, which is a second piston, housed in a low temperature-side cylinder 102, which is a second cylinder.

The high temperature-side cylinder 101 and the low temperature-side cylinder 102 are directly or indirectly supported by, or fixed to a base plate 111, which functions as a reference body. In the Stirling engine 100 of the first embodiment, the base plate 111 serves as a positional reference of the components of the Stirling engine 100. With this configuration, it is made possible to ensure the accuracy of the relative position between the components. In addition, as described later, in the Stirling engine 100 of the embodiment, respective gas bearings GB are interposed between the high temperature-side cylinder 101 and the high temperature-side piston 103, and between the low temperature-side cylinder 102 and the low temperature-side piston 104.

By fixing the high temperature-side cylinder 101 and the low temperature-side cylinder 102 directly or indirectly to the base plate 111, which functions as the reference body, it is possible to maintain the clearance between the piston and the cylinder with precision. Thus, the function of the gas bearings GB is satisfactorily carried out. In addition, it becomes easy to assemble the Stirling engine 100.

A heat exchanger 108 constituted of a substantially U-shaped heater 105, a regenerator 106, and a cooler 107 is disposed between the high temperature-side cylinder 101 and the low temperature-side cylinder 102. If the heater 105 is formed in a substantially U-shape in this way, it is possible to easily dispose the heater 105 even in a relatively narrow space, such as in the exhaust gas passage of the internal combustion engine. In addition, if the high temperature-side cylinder 101 and the low temperature-side cylinder 102 are arranged in an in-line arrangement as in the case of the Stirling engine 100, it is possible to relatively easily dispose the heater 105 even in a cylindrical space, such as in the exhaust gas passage of the internal combustion engine.

One end of the heater 105 is positioned next to the high temperature-side cylinder 101, and the other end thereof is positioned next to the regenerator 106. One end of the regenerator 106 is positioned next to the heater 105, and the other end thereof is positioned next to the cooler 107. One end of the cooler 107 is positioned next to the regenerator 106, and the other end thereof is positioned next to the low temperature-side cylinder 102.

A working fluid (air in the embodiment) is confined in the high temperature-side cylinder 101, the low temperature-side cylinder 102 and the heat exchanger 108, and realizes the Stirling cycle with the heat supplied from the heater 105 and the heat discharged from the cooler 107 to drive the Stirling engine 100.

The heater 105 and the cooler 107 may be formed by bundling a plurality of tubes made of a material that has high thermal conductivity and excellent thermal resistance, for example. The regenerator 106 may be made of a porous heat storage unit. The composition of the heater 105, the cooler 107 and the regenerator 106 is not limited to this example. Specifically, the composition may be suitably selected depending on the thermal conditions of the subject from which exhaust heat is recovered, the specifications of the Stirling engine 100, etc.

With regard to the heat exchanger 108, at least the heater 105 is disposed in an exhaust gas passage 5. The heater 105 heats up the working fluid in the heater 105 using the thermal energy of the exhaust gas Ex flowing through the exhaust gas passage 5. The regenerator 106 of the heat exchanger 108 may also be disposed in the exhaust gas passage 5.

In the first embodiment, the exhaust gas Ex flows from the high-temperature cylinder 101 side to the low-temperature cylinder 102 side. Thus, the exhaust gas Ex discharged from the heat engine is supplied to the heater 105 with a small drop in the temperature thereof, so that it is possible to efficiently recover the thermal energy of the exhaust gas Ex.

As described above, the high temperature-side piston 103 and the low temperature-side piston 104 are supported in the high temperature-side cylinder 101 and the low temperature-side cylinder 102, respectively, with the respective gas bearings GB interposed therebetween. In other words, the piston is supported in the cylinder without any piston rings. In this way, it is possible to reduce the friction between the piston and the cylinder, thereby improving the thermal efficiency of the Stirling engine 100. In addition, the reduction in the friction between the piston and the cylinder makes it possible to recover thermal energy by operating the Stirling engine 100 even under the operating conditions of a low-temperature heat source and low temperature difference, such as in the case of the exhaust heat recovery of the internal combustion engine.

As shown in FIG. 1, the components of the Stirling engine 100, such as the high temperature-side cylinder 101, the high temperature-side piston 103, a connecting rod 109 and a crankshaft 110, are housed in a housing 100C. The housing 100C of the Stirling engine 100 includes a crankcase 114A and a cylinder block 114B. A pressurizing device 115 increases the pressure in the housing 100C. The purpose of this is to pressurize the working fluid in the high temperature-side cylinder 101, the low temperature-side cylinder 102 and the heat exchanger 108 to obtain more power output from the Stirling engine 100.

In the Stirling engine 100 of the first embodiment, a sealed bearing 116 is fitted to the housing 100C, and supports the crankshaft 110. The crankshaft 110 serves as the output shaft of the Stirling engine 100. The motive power produced by the Stirling engine 100 is output from the housing 100C through a flexible coupling 118, such as the Oldham's coupling. Next, a configuration of the exhaust heat recovery apparatus according to the first embodiment will be described.

Figure 2:
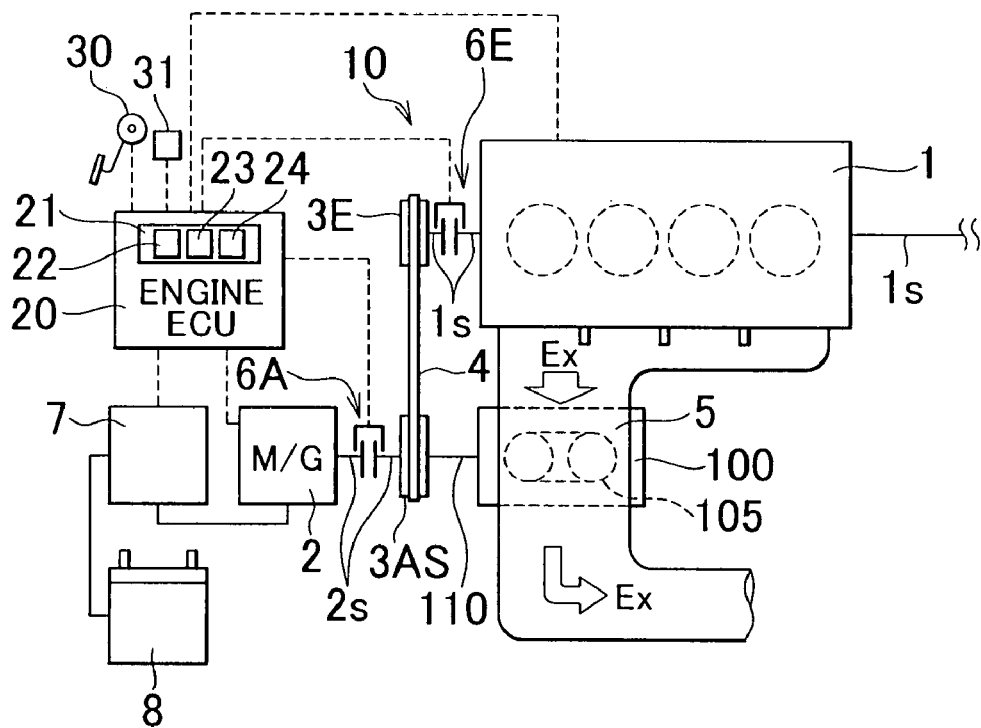
FIG. 2 is a plan view showing a configuration of the exhaust heat recovery apparatus according to the first embodiment.
Figure 3:
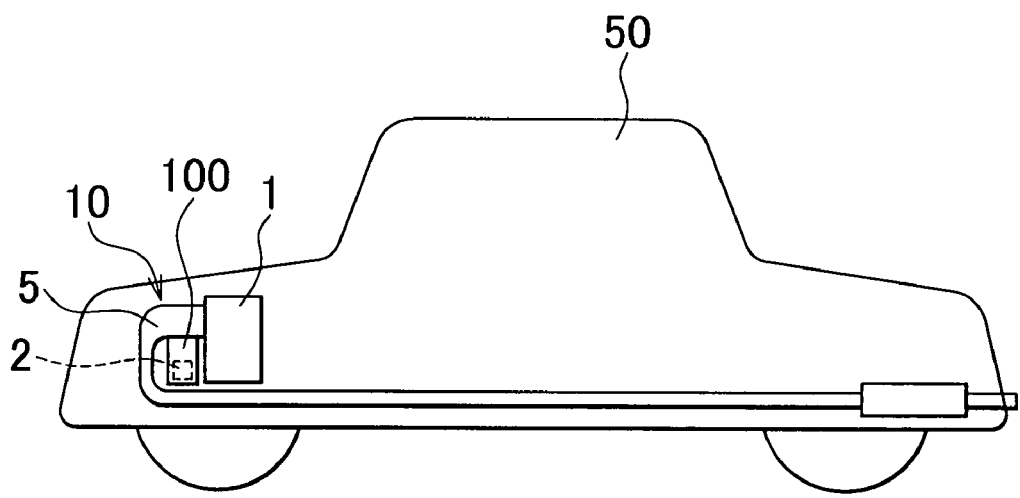
FIG. 3 is a schematic diagram showing a state in which the exhaust heat recovery apparatus according to the first embodiment is mounted on a vehicle.

FIG. 2 is a plan view showing the configuration of the exhaust heat recovery apparatus according to the first embodiment. FIG. 3 is a schematic diagram showing a state in which the exhaust heat recovery apparatus according to the first embodiment is mounted on a vehicle. The exhaust heat recovery apparatus 10 according to the embodiment is mounted on a vehicle and serves as a motive power source. The exhaust heat recovery apparatus 10 according to the embodiment includes: the Stirling engine 100, which functions as the exhaust heat recovery unit; a first clutch 6E, which functions as the first power transmission-switching device; and a second clutch 6A, which functions as the second power transmission-switching device; and the electric generator (M/G) 2.

The internal combustion engine 1 and the Stirling engine 100 are mounted on a vehicle 50, such as a passenger car and a truck, and serves as motive power sources of the vehicle 50, for example. The internal combustion engine 1 serves as a main motive power source and constantly produces power output while the vehicle 50 is running. The Stirling engine 100 cannot produce a minimum necessary amount of motive power until the temperature of the exhaust gas Ex reaches a certain temperature. Thus, the Stirling engine 100 produces motive power using the thermal energy recovered from the exhaust gas Ex of the internal combustion engine 1 and drives the vehicle in cooperation with the internal combustion engine 1 after the temperature of the exhaust gas Ex exceeds a predetermined temperature. In this way, the Stirling engine 100 serves as a secondary motive power source of the vehicle 50.

In the exhaust heat recovery apparatus 10 according to the embodiment, the Stirling engine 100 is disposed near the internal combustion engine 1, which functions as the heat engine from which exhaust heat is recovered. The Stirling engine 100 and the internal combustion engine 1 are arranged so that the crankshaft 110 of the Stirling engine 100 and an output shaft 1s of the internal combustion engine 1 are arranged substantially in parallel. In this way, it is possible to relatively easily transmit the motive power produced by the Stirling engine 100 to the output shaft (heat engine output shaft) 1s of the internal combustion engine 1 using a belt, a chain, a gear train, or the like. In addition, it is possible to use the Stirling engine 100 to recover the exhaust heat of the internal combustion engine 1 without any significant changes in the design of the conventional internal combustion engine 1.

The heater 105 of the Stirling engine 100 is disposed in the exhaust gas passage 5 of the internal combustion engine 1. The Stirling engine 100 produces motive power by recovering, through the heater 105, the thermal energy of the exhaust gas Ex discharged from the internal combustion engine 1. The motive power is output from the crankshaft (exhaust-heat-recovery-unit output shaft) 110 of the Stirling engine 100.

A Stirling engine/electric generator pulley 3AS is fixed to the crankshaft 110 of the Stirling engine 100. An internal combustion engine pulley 3E is fixed to the output shaft 1s of the internal combustion engine 1. A belt 4, which functions as a power transmission means, is looped around the Stirling engine/electric generator pulley 3AS and the internal combustion engine pulley 3E.

With this configuration, the motive power produced by the Stirling engine 100 is transmitted to the output shaft 1s of the internal combustion engine 1, and output from the output shaft 1s of the internal combustion engine 1 together with the motive power produced by the internal combustion engine 1. The mechanism for transmitting the motive power from the Stirling engine 100 to the output shaft 1s of the internal combustion engine 1 is not limited to such a mechanism. A chain and sprockets, or a gear train may be used, for example.

A first clutch 6E, which functions as the first power transmission-switching device, is provided between the internal combustion engine 1, which functions as the heat engine, and the Stirling engine 100, which functions as the exhaust heat recovery unit, the same clutch 6E being provided between the internal combustion engine 1 and the electric generator 2. In the first embodiment, the first clutch 6, which functions as the first power transmission-switching device, is fixed to the output shaft 1s of the internal combustion engine 1 between the internal combustion engine 1 and the internal combustion engine pulley 3E. With this configuration, it is possible to switch the transmission of the motive power produced by the Stirling engine 100 that is input from the internal combustion engine pulley 3E to the output shaft 1s of the internal combustion engine 1.

When the first clutch 6E is brought into a connected state, or engaged, the crankshaft 110 of the Stirling engine 100 and the output shaft 1s of the internal combustion engine 1 are mechanically connected. Thus, the Stirling engine 100 and the internal combustion engine 1 are connected, and the motive power produced by the Stirling engine 100 is transmitted to the output shaft 1s of the internal combustion engine 1 through the first clutch 6E. When the first clutch 6E is brought into a disconnected state, or released, the connection between the internal combustion engine 1 and the Stirling engine 100 is cut off (a disconnected state is brought about), and, therefore, the motive power from the Stirling engine 100 is not transmitted from the internal combustion engine pulley 3E to the output shaft 1s of the internal combustion engine 1.

The operation of the first clutch 6E is controlled by a clutch control section 23 of an exhaust heat recovery apparatus control section 21 provided in an engine ECU (Electric Control Unit) 20. The exhaust heat recovery apparatus control section 21 carries out the function of controlling the exhaust heat recovery apparatus 10 that the engine ECU 20 includes. The exhaust heat recovery apparatus control section 21 includes an operational status determination section 22, the clutch control section 23, and an electricity generation control section 24, which control the operation of the exhaust heat recovery apparatus 10 according to the embodiment.

An input shaft 2s of the electric generator 2 is fixed to the Stirling engine/electric generator pulley 3AS. The second clutch 6A, which functions as the second power transmission-switching device, is provided between the electric generator 2 and the Stirling engine 100, which functions as the exhaust heat recovery unit. In this example, the second clutch 6A is provided on the input shaft 2s of the electric generator 2 between the electric generator 2 and the Stirling engine/electric generator pulley 3AS.

The electric generator 2 is driven by the Stirling engine 100 through the second clutch 6A provided on the input shaft 2s of the electric generator 2. Specifically, when the second clutch 6A is brought into a connected state, or engaged, the Stirling engine 100 and the electric generator 2 are connected, and the electric generator 2 is driven by the motive power produced by the Stirling engine 100, and generates electric power. When the second clutch 6A is brought into a disconnected state, or released, the Stirling engine 100 and the electric generator 2 are disconnected. As a result, the motive power produced by the Stirling engine 100 is not transmitted to the electric generator 2, and the electricity generation by the electric generator 2 is stopped.

The operation of the second clutch 6A is controlled by the clutch control section 23 of the exhaust heat recovery apparatus control section 21 in the engine ECU 20. The electric power generated by the electric generator 2 is stored in a storage battery 8 through a rectifier 7. The electric generator 2 and the rectifier 7 are controlled by the electricity generation control section 24 of the exhaust heat recovery apparatus control section 21 provided in the engine ECU 20.

With this configuration, by engaging or releasing the first clutch 6E, and by engaging or releasing the second clutch 6A, the exhaust heat recovery apparatus 10 according to the embodiment selects the internal combustion engine 1 or the electric generator 2 as the subject to which motive power from the Stirling engine 100 is transmitted. Specifically, when the first clutch 6E is engaged and the second clutch 6A is released, the crankshaft 110 of the Stirling engine 100 and the output shaft 1s of the internal combustion engine 1 are mechanically connected, and the motive power produced by the Stirling engine 100 is transmitted to the output shaft 1s of the internal combustion engine 1. The motive power produced by the Stirling engine 100 is output from the output shaft 1s of the internal combustion engine 1 together with the motive power produced by the internal combustion engine 1.

On the other hand, when the first clutch 6E is released and the second clutch 6A is engaged, the crankshaft 110 of the Stirling engine 100 and the input shaft 2s of the electric generator 2 are mechanically connected, and the motive power produced by the Stirling engine 100 is transmitted to the input shaft 2s of the electric generator 2. The electric generator 2 is driven by the motive power produced by the Stirling engine 100, and generates electric power.

The thermal energy that the Stirling engine 100 recovers from the exhaust gas Ex of the internal combustion engine 1 is converted into electric energy by the electric generator 2, and stored in the storage battery 8 through the rectifier 7. Thus, it is possible either to output the motive power produced by the Stirling engine 100 together with the motive power produced by the internal combustion engine 1, or to cause the electric generator 2 to generate electric power, depending on the operational status of the internal combustion engine 1.

Figure 4:
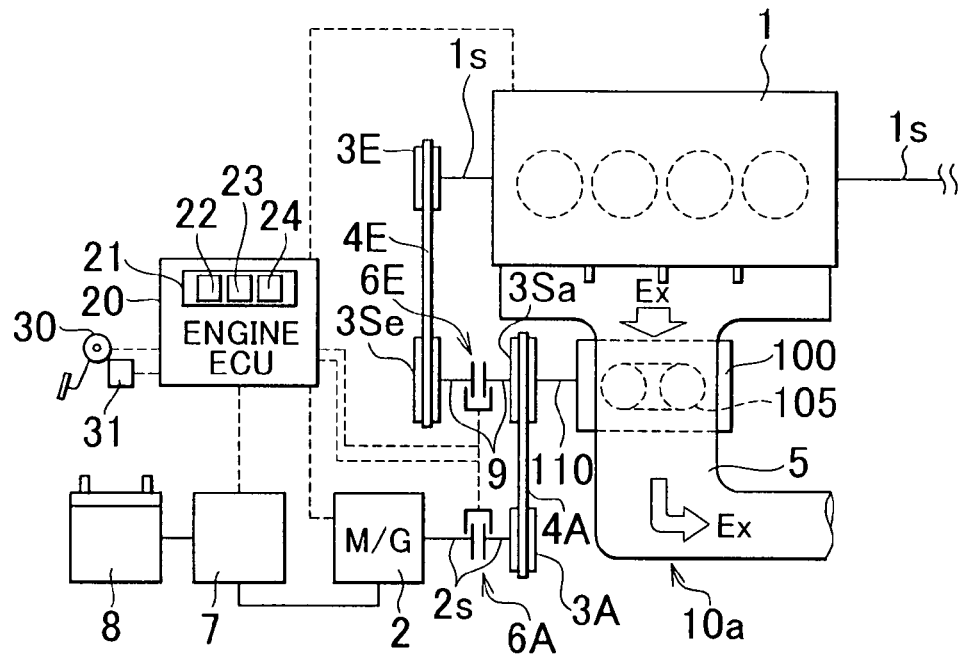
FIG. 4 is a plan view showing the configuration of the exhaust heat recovery apparatus according to a modification of the first embodiment.

FIG. 4 is a plan view showing the configuration of the exhaust heat recovery apparatus according to a modification of the first embodiment. An exhaust heat recovery apparatus 10a has a configuration similar to that of the above-described exhaust heat recovery apparatus 10, except that the motive power produced by the Stirling engine 100, which functions as the exhaust heat recovery unit, is transmitted to the electric generator 2 through pulleys and a belt.

A first pulley 3Sa for the Stirling engine is fixed to the crankshaft 110 of the Stirling engine 100. The first Stirling-engine pulley 3Sa is fitted with a power transmission shaft 9. The power transmission shaft 9 is provided with the first clutch 6E, which functions as the first power transmission-switching device, and a second pulley 3Se for the Stirling engine. The first clutch 6E may be provided for the output shaft 1s of the internal combustion engine 1, between the internal combustion engine 1 and the internal combustion engine pulley 3E.

The crankshaft 110 is connected to the second Stirling-engine pulley 3Se through the first Stirling-engine pulley 3Sa, the first clutch 6E and the power transmission shaft. A belt 4E, which functions as the first power transmission means, is looped around the second Stirling-engine pulley 3Se and the internal combustion engine pulley 3E. The transmission of the motive power produced by the Stirling engine 100 to the output shaft 1s of the internal combustion engine 1 is switched by engaging/releasing the first clutch 6E.

A belt 4A, which functions as the second power transmission means, is looped around the first Stirling-engine pulley 3Sa. In addition, the belt 4A is looped around an electric generator pulley 3A. The electric generator pulley 3A is fixed to the input shaft 2s of the electric generator 2 with the second clutch 6A, which functions as the second power transmission means, interposed between the electric generator 2 and the electric generator pulley 3A. The transmission of the motive power produced by the Stirling engine 100 to the input shaft 2s of the electric generator 2 is switched by engaging/releasing the second clutch 6A.

In the exhaust heat recovery apparatus 10a according to the modification, as in the case of the exhaust heat recovery apparatus 10 (see FIG. 2) according to the embodiment, the first clutch 6E, which functions as the first power transmission-switching device, is provided between the internal combustion engine 1, which functions as the heat engine, and the Stirling engine 100, which functions as the exhaust heat recovery unit, the same power transmission-switching device being provided between the internal combustion engine 1 and the electric generator 2. The second clutch 6A, which functions as the second power transmission-switching device, is provided between the electric generator 2 and the Stirling engine 100, which functions as the exhaust heat recovery unit. With such a configuration, it is possible for the exhaust heat recovery apparatus 10a according to the modification either to output the motive power produced by the Stirling engine 100 together with the motive power produced by the internal combustion engine 1, or to cause the electric generator 2 to generate electric power, depending on the operational status of the internal combustion engine 1.

Figure 5:
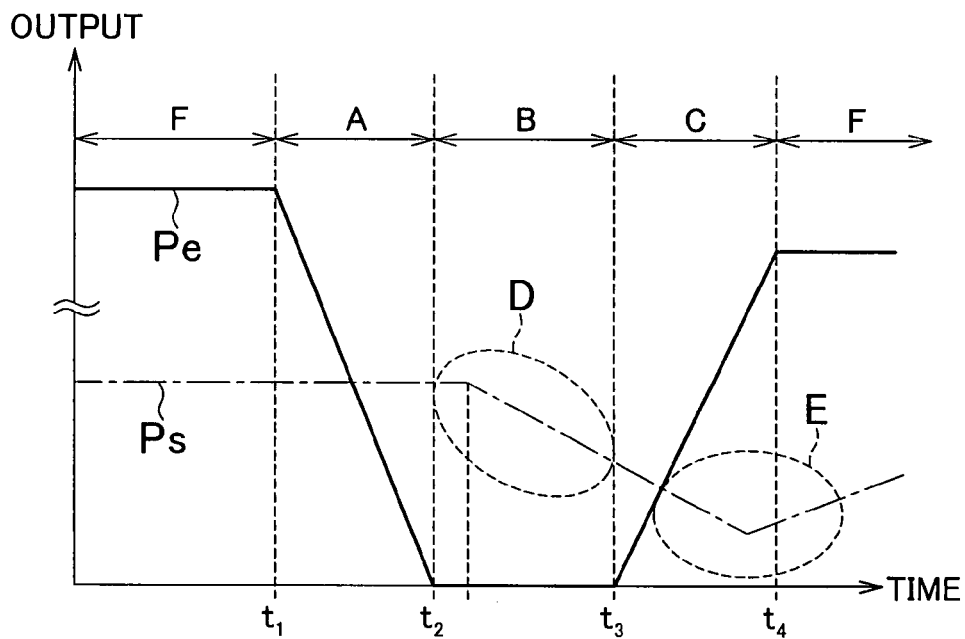
FIG. 5 is a schematic diagram showing the variation with time of the output from an internal combustion engine and the output from a Stirling engine when the vehicle on which the exhaust heat recovery apparatus according to the first embodiment is mounted runs and stops.

FIG. 5 is a schematic diagram showing the variation with time of the output from the internal combustion engine and the output from the Stirling engine when the vehicle on which the exhaust heat recovery apparatus according to the first embodiment is mounted runs and stops. Once the Stirling engine 100 starts to produce motive power (power output) by recovering thermal energy from the exhaust gas discharged from the internal combustion engine 1, the first clutch 6E is engaged, and the vehicle 50 (see FIG. 3) on which the exhaust heat recovery apparatus 10 or 10a according to the embodiment or the modification thereof is mounted is driven by the internal combustion engine 1 and the Stirling engine 100. The required power output for the vehicle 50 is the power output that is required when a driver of the vehicle 50 drives the vehicle. In this embodiment, the required power output for the vehicle 50 serves as an index indicating how much the resultant output power is required that is obtained by combining the motive power (heat engine output) Pe produced by the internal combustion engine 1 and the motive power (exhaust heat recovery unit output) Ps produced by the Stirling engine 100.

In the example shown in FIG. 5, the vehicle 50 runs at a constant speed up to t1, or from t4. In other words, the internal combustion engine 1 and the Stirling engine 100 are operated in a steady state (the periods indicated by F in FIG. 5). The vehicle 50 starts deceleration at t1, and stops at t2 (the period indicated by A in FIG. 5). In the region indicated by B in FIG. 5 (t2 to t3), the vehicle 50 is stopped. The vehicle 50 starts to run at t3, accelerates, and runs at a constant speed from t4 (the period indicated by C in FIG. 5). When the vehicle 50 is in a decelerating state (t1 to t2), the heat engine output Pe gradually decreases. With this decrease, the temperature of the exhaust gas discharged from the internal combustion engine 1 also decreases.

By virtue of the heat capacity of the heater 105 and the regenerator 106, the Stirling engine 100 continues to produce motive power until the amount of the heat stored in the heater 105, etc is reduced to a certain level. Thus, even if the heat engine output Pe drops between t1 and t2, the exhaust heat recovery unit output Ps remains substantially constant. Then, after a certain time has passed since the vehicle 50 stops and the heat engine output Pe becomes zero, the exhaust heat recovery unit output Ps starts to decrease (the period indicated by D in FIG. 5).

When the vehicle 50 stops, the required power output for the vehicle 50 becomes zero. Specifically, there is neither request to drive the internal combustion engine 1, nor request to drive the Sterling engine 100. In this case, the heat engine output Pe becomes zero by stopping the internal combustion engine 1, for example. However, the Stirling engine 100 produces motive power by virtue of the heat capacity of the heater 105, etc. even after the internal combustion engine 1 stops, and the exhaust heat recovery unit output Ps therefore becomes a surplus.

In this embodiment and the modification thereof, when the required power output for the vehicle 50 is zero (that is, when there is no request to drive either of the internal combustion engine 1 and the Stirling engine 100), the first clutch 6E is released and the second clutch 6A is engaged to drive the electric generator 2 using the surplus, exhaust heat recovery unit output Ps. In this way, it becomes possible to effectively use the surplus, exhaust heat recovery unit output Ps.

When the vehicle 50 starts to run at t3, the heat engine output Pe starts to increase, and the temperature of the exhaust gas generated by the internal combustion engine 1 also starts to increase. Because the heat input from the exhaust gas is transferred to the working fluid through the heater 105 in the Stirling engine 100, the Stirling engine 100 is less responsive to the variation of the heat input, and the output thereof is slow in following the rapid variation of the heat input. For this reason, the exhaust heat recovery unit output Ps increases with some delay relative to the increase in the internal combustion engine Pe (the region indicated by E in FIG. 5).

In this case, if the motive power produced by the Stirling engine 100 is transmitted to the output shaft 1s of the internal combustion engine 1, and this motive power is output together with the motive power produced by the internal combustion engine 1, the internal combustion engine 1 drives the Stirling engine 100. As a result, the Stirling engine 100 uses the motive power produced by the internal combustion engine 1, which results in the decline in the motive power produced by the internal combustion engine 1, and there is a possibility that the required power output cannot be obtained. In such a case, in this embodiment, it may be avoided by releasing the first clutch 6E that the Stirling engine 100 applies a load to the internal combustion engine 1. Then the required power output is produced by the internal combustion engine alone.

However, as described above, even when the Stirling engine 100 is applying a load to the internal combustion engine 1, the Stirling engine 100 produces motive power by recovering the thermal energy of the exhaust gas Ex discharged from the internal combustion engine 1. Accordingly, in order to effectively use the motive power, the second clutch 6A is engaged to allow the Stirling engine 100 to drive the electric generator 2 to generate electric power. In this way, it is possible to control the waste of the heat engine output Pe, and at the same time effectively use the motive power produced by the Stirling engine 100.

While the vehicle 50 runs at a constant speed (the periods indicated by F in FIG. 5), the internal combustion engine 1 and the Stirling engine 100 are in a steady state, more specifically, operated at a constant rotation speed and torque level. In this case, the temperature of the exhaust gas Ex discharged from the internal combustion engine 1 is substantially constant, and the Stirling engine 100 therefore produces substantially constant motive power. In such a case, in this embodiment, the first clutch 6E is engaged and the second clutch 6A is released, so that the exhaust heat recovery unit output Ps is output from the output shaft 1s of the internal combustion engine 1 together with the heat engine output Pe.

Thus, it is made possible to suppress the loss caused when the motive power is converted into electric energy because there is no need to convert the motive power produced by the Stirling engine 100 into electric energy. Accordingly, it is possible to effectively use the motive power produced by the Stirling engine 100. Next, an example of control of the exhaust heat recovery apparatus 10 or 10a according to the embodiment or the modification thereof will be described. First, a basic control example will be described. Please refer to FIGS. 1 to 5 if necessary in reading the following description.

Figure 6:
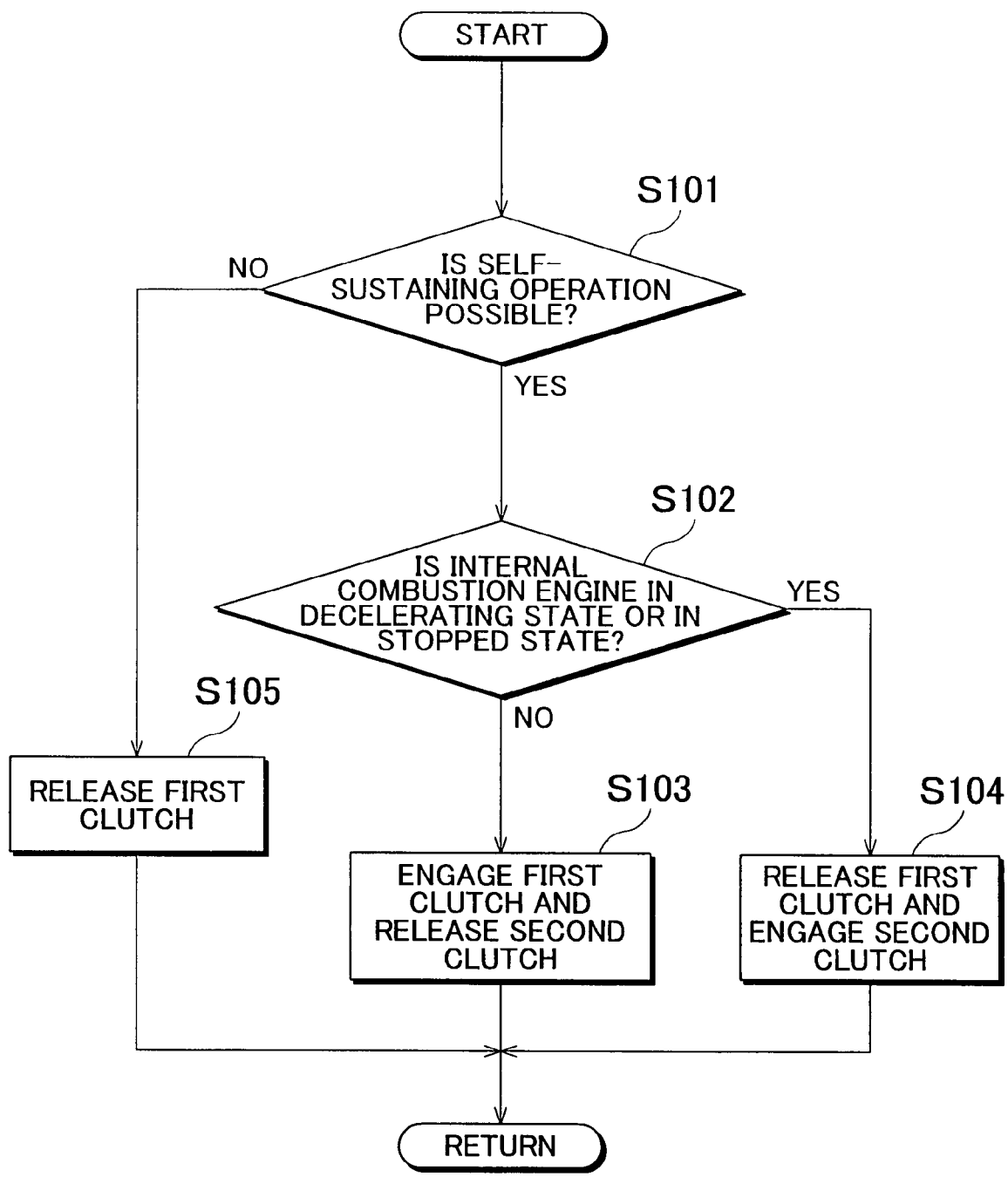
FIG. 6 is a flow chart showing an example of operation control of the exhaust heat recovery apparatus according to the first embodiment.

FIG. 6 is a flow chart showing an example of operation control of the exhaust heat recovery apparatus according to the first embodiment. In performing the operation control of the exhaust heat recovery apparatus 10 or 10a (hereinafter referred to as "the exhaust heat recovery apparatus 10 or the like") according to the embodiment or the modification thereof, the operational status determination section 22 that the exhaust heat recovery apparatus control section 21 of the engine ECU 20 includes determines whether the Stirling engine 100 can operate in a self-sustaining manner (S101).

"The Stirling engine 100 can operate in a self-sustaining manner" means that the Stirling engine 100 overcomes the friction therein and the inertia of the drive train, and produces motive power. As to whether the Stirling engine 100 can operate in a self-sustaining manner, if the temperature of the heater 105 of the Stirling engine 100 is higher than a predetermined target heater temperature, for example, it is determined that self-sustaining operation is possible.

If it is determined that the Stirling engine 100 cannot operate in a self-sustaining manner (No in step S101), the clutch control section 23 that the exhaust heat recovery apparatus control section 21 includes releases at least the first clutch 6E (S105). Thus, the mechanical connection between the crankshaft 110 of the Stirling engine 100 and the output shaft 1s of the internal combustion engine 1 is cut off, so that the Stirling engine 100 does not apply a load to the internal combustion engine 1. As a result, it is possible to suppress the increase in the fuel consumption of the internal combustion engine 1.

If it is determined that the Stirling engine 100 can operate in a self-sustaining manner (Yes in step S101), the operational status determination section 22 determines whether the internal combustion engine 1 is in a decelerating state or in a stopped state (S102). The decelerating state of the internal combustion engine 1, in other words, the state where the motive power produced by the internal combustion engine 1 is decreasing means a state where the vehicle 50 (see FIG. 3) on which the internal combustion engine 1 and the Stirling engine 100 are mounted is decelerating. The stopped state of the internal combustion engine 1, in other words, the state where the internal combustion engine 1 is not producing motive power means a state where the operation of the internal combustion engine 1 is stopped when the vehicle 50 is stopped because of the Idling Stop or so-called economy running).

"When the internal combustion engine 1 is neither in a decelerating state or nor in a stopped state" means that the internal combustion engine 1 is in an accelerating state (the rotational speed is increasing), or that the internal combustion engine 1 is operated in a steady state (steady operation, that is, a state where the internal combustion engine 1 is operated at a constant rotation speed and torque level), for example. In other words, it means that the vehicle 50 is in an accelerating state, or the vehicle 50 is running at a constant speed.

If the internal combustion engine 1 is neither in a decelerating state nor in a stopped state (No in step S102), the clutch control section 23 engages the first clutch 6E and releases the second clutch 6A (S103). As a result, the motive power produced by the Stirling engine 100 is transmitted to the output shaft 1s of the internal combustion engine 1 through the first clutch 6E. The motive power produced by the Stirling engine 100 is output together with the motive power produced by the internal combustion engine 1, and is used as the driving power for driving the vehicle 50. In this case, because the second clutch 6A is released, the motive power produced by the Stirling engine 100 does not drive the electric generator 2. Accordingly, the motive power produced by the Stirling engine 100 is not converted into electric power, and all of the motive power is output together with the motive power produced by the internal combustion engine 1. Thus, it is possible to avoid the energy loss caused when the motive power is converted into electric power, and it is therefore possible to efficiently use the motive power produced by the Stirling engine 100.

When the internal combustion engine 1 is in a decelerating state or in a stopped state (Yes in step S102), the clutch control section 23 releases the clutch 6E and engages the second clutch 6A (S104). In this way, the crankshaft 110 of the Stirling engine 100 and the input shaft 2s of the electric generator 2 are connected, so that the motive power produced by the Stirling engine 100 drives the electric generator 2. Then, the electricity generation control section 24 that the exhaust heat recovery apparatus control section 21 of the engine ECU 20 includes controls the electric generator 2 and the rectifier 7 according to the motive power produced by the Stirling engine 100 to store the generated electric power in the storage battery 8.

If the internal combustion engine 1 is in a decelerating state or in a stopped state, excessive motive power can be generated due to the response delay of the Stirling engine 100. In this embodiment, however, it is possible to convert the excessive motive power into electric energy by releasing the first clutch 6E and engaging the second clutch 6A, so that it is possible to effectively use the thermal energy that the Stirling engine 100 recovers from the exhaust gas Ex of the internal combustion engine 1. As a result, it is possible to suppress the decrease in the exhaust heat recovery efficiency, and the increase in the fuel consumption of the internal combustion engine 1.

When the internal combustion engine 1 is decelerating, the mechanical connection between the crankshaft 110 of the Stirling engine 100 and the output shaft 1s of the internal combustion engine 1 is cut off by releasing the first clutch 6E, so that the excessive motive power from the Stirling engine 100 does not drive the vehicle 50. In this way, it is possible to achieve the deceleration as demanded by the driver of the vehicle 50. Next, operation control of the exhaust heat recovery apparatus according to another example of the first embodiment will be described.

Figure 7:
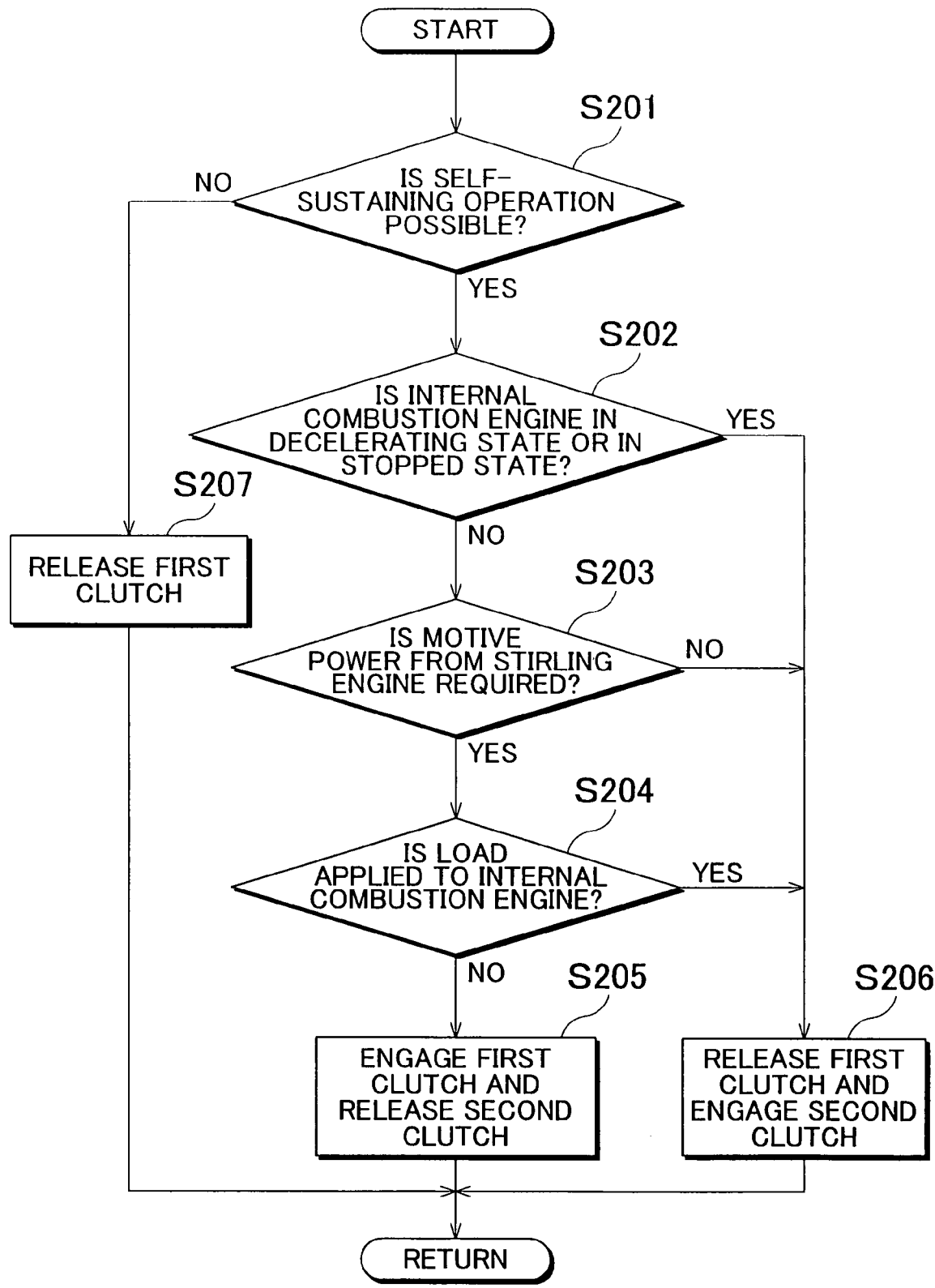
FIG. 7 is a flow chart showing operation control of an exhaust heat recovery apparatus according to another control example of the first embodiment.

FIG. 7 is a flow chart showing the operation control of the exhaust heat recovery apparatus according to another control example of the first embodiment. In performing the operation control of the exhaust heat recovery apparatus 10 or the like according to the embodiment or the modification thereof, the operational status determination section 22 that the exhaust heat recovery apparatus control section 21 of the engine ECU 20 includes determines whether the Stirling engine 100 can operate in a self-sustaining manner (S201).

If it is determined that the Stirling engine 100 cannot operate in a self-sustaining manner (No in step S201), the clutch control section 23 that the exhaust heat recovery apparatus control section 21 includes releases at least the first clutch 6E (S207). If it is determined that the Stirling engine 100 can operate in a self-sustaining manner (Yes in S201), the operational status determination section 22 determines whether there is a request to drive the internal combustion engine 1 (S202).

When the internal combustion engine 1 is neither in a decelerating state nor in a stopped state (No in step S202), the operational status determination section 22 determines whether the motive power from the Stirling engine 100 is required to drive the vehicle 50 based on the information acquired from an accelerator pedal operation amount sensor 30, a vehicle speed sensor 31, or the like, and the operational status of the internal combustion engine 1 (S203). When the internal combustion engine 1 is operated at a constant rotation speed and output level (steady operation), such as when the vehicle 50 (see FIG. 3) is running at a constant speed, or when the internal combustion engine 1 is in an accelerating state in order to accelerate the vehicle 50, for example, it is determined that the motive power from the Stirling engine 100 is required to drive the vehicle 50.

If the motive power from the Stirling engine 100 is required, the first clutch 6E is engaged and the motive power produced by the Stirling engine 100 is output together with the motive power produced by the internal combustion engine 1 to use the motive power as the driving force of the vehicle 50. In this case, the motive power produced by the Stirling engine 100 responds with delay to the variation of the heat input, and thus, there is a possibility that the motive power produced by the Stirling engine 100 cannot follow the variation of the motive power produced by the internal combustion engine 1. In this case, if the first clutch 6E is engaged, the internal combustion engine 1 drives the Stirling engine 100. As a result, the Stirling engine 100 uses the motive power produced by the internal combustion engine 1, and therefore applies a load to the internal combustion engine, which results in the decline in the power output of the internal combustion engine 1, and the increase in the fuel consumption thereof.

For this reason, if it is determined that the motive power from the Stirling engine 100 is required (Yes in step S203), the operational status determination section 22 determines whether the Stirling engine 100 applies a load to the internal combustion engine 1 (S204). In the case where the load that the Stirling engine 100 applies is acceptable in addition to the case where the Stirling engine 100 does not apply a load to the internal combustion engine 1 at all, it is determined that the Stirling engine 100 does not apply a load to the internal combustion engine 1.

Whether the Stirling engine 100 applies a load to the internal combustion engine 1 may be determined based on, for example, whether the increase in the rotation speed (exhaust heat recovery unit rotation speed) Ns of the Stirling engine 100 follows the increase in the rotation speed (heat engine rotation speed) Ne of the internal combustion engine 1. Specifically, when the increase in the exhaust heat recovery unit rotation speed Ns follows the increase in the heat engine rotation speed Ne, it is determined that the Stirling engine 100 does not apply a load to the internal combustion engine 1. On the other hand, when the increase in the exhaust heat recovery unit rotation speed Ns lags behind the increase in the heat engine rotation speed Ne, it is determined that the Stirling engine 100 applies a load to the internal combustion engine 1.

"When the increase in the exhaust heat recovery unit rotation speed Ns follows the increase in the heat engine rotation speed Ne" implies "when the motive power produced by the internal combustion engine 1 is not used by the Stirling engine 100 when the exhaust heat recovery unit rotation speed Ns increases as the heat engine rotation speed Ne increases." "When the increase in the exhaust heat recovery unit rotation speed Ns lags behind the increase in the heat engine rotation speed Ne" implies "when the Stirling engine 100 is driven by the internal combustion engine 1, and as a result, uses the motive power produced by the internal combustion engine 1, when the exhaust heat recovery unit rotation speed Ns increases as the heat engine rotation speed Ne increases." When the internal combustion engine 1 is in an accelerating state, if the motive power produced by the internal combustion engine 1 is less than the required power output for the vehicle 50, it may be determined that the Stirling engine 100 does not apply a load to the internal combustion engine 1.

Whether the increase in the exhaust heat recovery unit rotation speed Ns follows the increase in the heat engine rotation speed Ne may be determined by comparing the increase rate (exhaust heat recovery unit acceleration) of the exhaust heat recovery unit rotation speed Ns per unit time and the increase rate (heat engine acceleration) of the heat engine rotation speed Ne per unit time that are the increase rates when there is a request to accelerate the vehicle 50.

For example, the motive power produced by the Stirling engine 100 is estimated from the temperature of the exhaust gas Ex discharged from the internal combustion engine 1, the temperature of the heater 105 of the Stirling engine 100, etc. Subsequently, a comparison is made between the exhaust heat recovery unit acceleration by which the produced motive power accelerates the inertia of the Stirling engine 100 (the inertia of the rotary body), and the heat engine acceleration for the internal combustion engine 1 that is calculated from the operation amount and the operation velocity at which the accelerator pedal is operated, for example. If the comparison result shows that the exhaust heat recovery unit acceleration is less than the heat engine acceleration, it is determined that the increase in the exhaust heat recovery unit rotation speed Ns lags behind the increase in the heat engine rotation speed Ne.

When the motive power from the Stirling engine 100 is required (Yes in step S203), and the Stirling engine 100 does not apply a load to the internal combustion engine 1 (No in step S204), the clutch control section 23 engages the first clutch 6E, and releases the second clutch 6A (S205). In this way, the motive power produced by the Stirling engine 100 is transmitted to the output shaft 1s of the internal combustion engine 1 through the first clutch 6E. The motive power produced by the Stirling engine 100 is output together with the motive power produced by the internal combustion engine 1, and used as the driving power for driving the vehicle 50.

At this time, the second clutch 6A is in a released state, and the motive power produced by the Stirling engine 100 is therefore not used to drive the electric generator 2. Thus, the motive power produced by the Stirling engine 100 is not converted into electric power; all of the motive power is output together with the motive power produced by the internal combustion engine 1. In this way, it is possible to avoid the energy loss caused when the motive power is converted into electric power, and it is therefore possible to efficiently use the motive power produced by the Stirling engine 100.

In addition, it is possible to use the motive power produced by the Stirling engine 100 when the internal combustion engine 1 is in an accelerating state. Thus, it is possible to suppress the increase in the fuel consumption of the internal combustion engine 1 during acceleration. When the internal combustion engine 1 is in an accelerating state, and the sum of the motive power produced by the internal combustion engine 1 and the motive power produced by the Stirling engine 100 is greater than the required motive power, the motive power produced by the Stirling engine 100 may be used to drive the electric generator 2, and the internal combustion engine 1 may produce the required motive power. In this way, it is made possible to drive the vehicle 50 as demanded by the driver, and at the same time effectively use the motive power produced by the Stirling engine 100.

When the internal combustion engine 1 is in a decelerating state or in a stopped state (Yes in step S202), when the motive power from the Stirling engine 100 is not required (No in step S203), or when the Stirling engine 100 becomes a load to the internal combustion engine 1 (Yes in step S204), the Stirling engine 100 produces surplus motive power due to poor output response. In this case, the clutch control section 23 releases the first clutch 6E, and engages the second clutch 6A (S206).

In this way, the crankshaft 110 of the Stirling engine 100 and the input shaft 2s of the electric generator 2 are connected, and the surplus motive power produced by the Stirling engine 100 is used to drive the electric generator 2. The electricity generation control section 24 that the exhaust heat recovery apparatus control section 21 of the engine ECU 20 includes controls the electric generator 2 and the rectifier 7 according to the motive power produced by the Stirling engine 100 to store the produced electric power in the storage battery 8.

When the internal combustion engine 1 is in a decelerating state or in a stopped state, when the motive power from the Stirling engine 100 is not required, or when the Stirling engine 100 becomes a load to the internal combustion engine 1, surplus motive power is produced due to the delay in the output response of the Stirling engine 100. However, in this embodiment, it is possible to convert the surplus motive power produced by the Stirling engine 100 into electric energy by releasing the first clutch 6E and engaging the second clutch 6A, so that it is possible to effectively use the thermal energy that the Stirling engine 100 recovers from the exhaust gas Ex of the internal combustion engine 1. As a result, it is possible to suppress the decrease in the exhaust heat recovery efficiency, and the increase in the fuel consumption of the internal combustion engine 1.

When the internal combustion engine 1 decelerates, the first clutch 6E is released to cut off the mechanical connection between the crankshaft 110 of the Stirling engine 100 and the output shaft 1s of the internal combustion engine 1. In this way, when the vehicle 50 decelerates, the deceleration as demanded by the driver is achieved because the surplus motive power from the Stirling engine 100 is not used to drive the vehicle 50.

When the Stirling engine 100 becomes a load to the internal combustion engine 1, the first clutch 6E is released to cut off the mechanical connection between the crankshaft 110 of the Stirling engine 100 and the output shaft 1s of the internal combustion engine 1. Thus, the Stirling engine 100 does not apply a load to the internal combustion engine 1, and it is therefore possible to suppress the decline in the power output of the internal combustion engine 1, and the increase in the fuel consumption thereof.

As described above, in the embodiment and the modification thereof, the output from the exhaust heat recovery unit and the output from the heat engine are combined and output from a common shaft, and the exhaust heat recovery apparatus includes the electric generator that is driven by the exhaust heat recovery unit. The heat engine or the electric generator is selected and connected to the exhaust heat recovery unit depending on the operational status of the heat engine. In this way, it is made possible to either output the motive power produced by the exhaust heat recovery unit together with the motive power produced by the heat engine, or convert the motive power produced by the exhaust heat recovery unit into electric energy and then output the power, depending on the operational status of the heat engine. As a result, even when the exhaust heat recovery unit produces surplus motive power, it is possible to effectively use the motive power by converting it into electric energy. It should be noted that an apparatus having a configuration similar to that disclosed by the embodiment and the modification thereof shows operations and effects similar to those of the embodiment and the modification thereof. In addition, the configuration disclosed by the embodiment and the modification thereof can be applied also in the following second embodiment as appropriate.

Next, a second embodiment will be described. The second embodiment is substantially the same as the first embodiment, except that a heat storage unit for storing the heat of the exhaust gas is fixed on a high-temperature portion of the exhaust heat recovery unit that the exhaust heat recovery apparatus includes, and that the heat stored in the heat storage unit is used to drive the exhaust heat recovery unit after the heat engine, from which exhaust heat is recovered, is stopped. Excluding the exhaust heat recovery unit, the configuration of the second embodiment is similar to the first embodiment, and the description thereof will be omitted.

Figure 8:
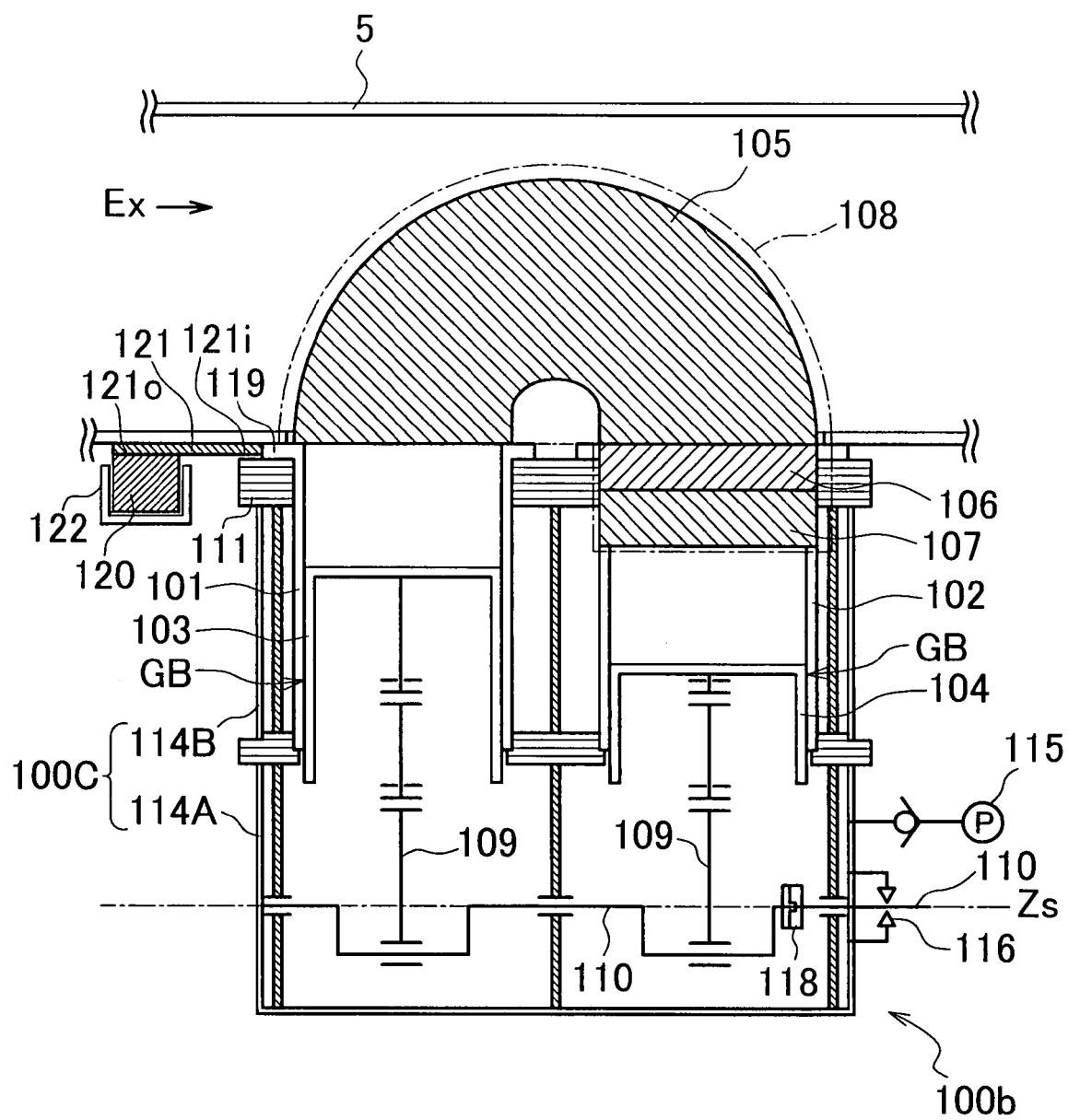
FIG. 8 is a sectional view showing a Stirling engine that an exhaust heat recovery apparatus according to a second embodiment includes.

FIG. 8 is a sectional view showing a Stirling engine that the exhaust heat recovery apparatus according to the second embodiment includes. As shown in FIG. 8, the Stirling engine (exhaust heat recovery unit) 100b that the exhaust heat recovery apparatus according to the embodiment is provided with a heat storage material 120 on a high-temperature portion, which functions as the heat storage unit. It should be noted that the Stirling engine 100b may be replaced by the Stirling engine 100 that the exhaust heat recovery apparatus 10 or the like (see FIGS. 2 and 4) according to the first embodiment, or the modification thereof includes.

The heat storage material 120 stores the heat of the exhaust gas Ex discharged from the internal combustion engine 1. Metallic material, such as iron and aluminum, and cement, for example, can be used as the heat storage material 120. The heat storage material 120 is surrounded by a heat insulator 122, so that the emission of the heat stored in the heat storage material 120 is suppressed. In this embodiment, in order to transfer the heat of the exhaust gas Ex to the heat storage material 120 and store the heat therein, a heat pipe 121 is used as a heat transfer means. The heat of the exhaust gas Ex is transferred to the heat storage material 120 through evaporation and condensation of the working fluid confined in the heat pipe 121. With the use of the heat pipe 121, it is possible to transfer heat from a heat source to the heat storage material 120 even when the heat storage material 120 and the heat source are distant from each other.

It is preferable that a heat input portion 121i of the heat pipe 121 be fixed on a high-temperature portion of the Stirling engine 100b. With this configuration, there is no need to provide the heat input portion 121i of the heat pipe 121 in the exhaust gas passage 5, and it is therefore possible to prevent the pressure loss in the exhaust gas passage 5 from increasing. It should be noted that a branch passage may be provided on the exhaust gas passage 5, and the heat input portion 121i of the heat pipe 121 may be provided in the branch passage to store the heat of the exhaust gas Ex.

The high-temperature portions of the Stirling engine 100b are portions, which include the regenerator 106, where the temperature exceeds the temperature of the regenerator 106. In this embodiment, the heat input portion 121i of the heat pipe 121 is fixed on a flange portion 119 of the high temperature-side cylinder 101. A heat output portion 121o of the heat pipe 121 is fixed on the heat storage material 120. Thus, the heat of the exhaust gas Ex is stored in the heat storage material 120 through the high temperature portion of the Stirling engine 100b.

With the use of the flange portion 119 of the high temperature-side cylinder 101, it is possible to relatively easily fix the heat input portion 121i of the heat pipe 121 on the high temperature portion of the Stirling engine 100b. The flange portion 119 of the high temperature-side cylinder 101 is a portion that is integrally formed with the high temperature-side cylinder 101, and projects on the side where the high temperature-side cylinder 101 and the heater 105 are connected, and engages with the base plate 111.

When the internal combustion engine 1 is stopped because the request to drive the internal combustion engine 1 is stopped, and, as a result, supplying the exhaust gas Ex to the heater 105 of the Stirling engine 100b is stopped, the Stirling engine 100b is driven by the heat stored in the heater 105. In this case, the clutch control section 23 that the ECU 20 includes releases the first clutch 6E and engages the second clutch 6A, so that the Stirling engine 100b drives the electric generator 2. This is the explanation of the case where the Stirling engine 100b of the second embodiment is replaced by the Stirling engine 100 that the exhaust heat recovery apparatus 10 according to the first embodiment includes (see FIG. 2).

If the heat stored in the heater 105 is used to drive the Stirling engine 100b, the temperature of the heater 105 drops. When the temperature of the heater 105 drops below the temperature of the heat storage material 120, the heat in the heat storage material 120 is transferred to the heater 105 by heat conduction through the metallic portion of the heat pipe 121. In this way, the Stirling engine 100b is driven by the heat stored in the heat storage material 120. When the heat stored in the heat storage material 120 has been used to the extent that it is impossible to drive the Stirling engine 100b, the Stirling engine 100b is stopped. As described above, in this embodiment, the thermal energy of the exhaust gas Ex of the internal combustion engine 1 is stored in the heat storage material 120, so that it is possible to use the thermal energy of the exhaust gas Ex from the internal combustion engine 1 more effectively.

The heat input portion 121i of the heat pipe 121 may be fixed on the heat storage material 120, and the heat output portion 120o of the heat pipe 121 may be fixed on the high temperature portion (the flange portion 119 of the high temperature-side cylinder 101, for example) of the Stirling engine 100. Then, heat may be transferred from the heat storage material 120 to the heater 105 through evaporation and condensation of the working fluid confined in the heat pipe 121. In this case, the heat of the exhaust gas Ex is transferred to the heat storage material 120 by heat conduction through the metallic portion of the heat pipe 121.

As described above, in this embodiment, the heat storage unit for storing the heat of the exhaust gas is fixed on the high temperature portion of the exhaust heat recovery unit, and the exhaust heat recovery unit is driven by the heat stored in the heat storage unit after the heat engine, from which exhaust heat is recovered, is stopped. In this way, it is possible to effectively use the thermal energy of the exhaust gas discharged from the heat engine. It should be noted that an apparatus having a configuration similar to that disclosed by the second embodiment shows operations and effects similar to those of the second embodiment.

As described above, the exhaust heat recovery apparatus according to the present invention is useful with respect to the configuration in which the output from the exhaust heat recovery unit and the output from the heat engine are combined and output from a common shaft. In particular, the exhaust heat recovery apparatus is suitable to effectively use the surplus motive power produced by the exhaust heat recovery unit.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An exhaust heat recovery apparatus, comprising:
an exhaust heat recovery unit that produces motive power by recovering thermal energy from exhaust gas discharged from a heat engine;
an electric generator that is driven by the exhaust heat recovery unit;
a first power transmission-switching device that switches between connection and disconnection between the heat engine and the exhaust heat recovery unit;
a second power transmission-switching device that switches between connection and disconnection between the exhaust heat recovery unit and the electric generator; and
a control section connected to the first power transmission-switching device and the second power transmission-switching device that controls the first power transmission-switching device and the second power transmission-switching device,
wherein the heat engine or the electric generator is selectively connected to the exhaust heat recovery unit, depending on operational status of the heat engine, and
wherein when the heat engine is in a decelerating state or in a stopped state, the first power transmission-switching device is brought into a disconnected state, and the second power transmission-switching device is brought into a connected state.

2. The exhaust heat recovery apparatus according to claim 1, further comprising:
a heat storage unit that stores heat obtained from exhaust gas of the heat engine, wherein,
if there is no request to drive the heat engine, and a temperature of a heater that the exhaust heat recovery unit includes to recover thermal energy becomes lower than the temperature of the heat storage unit, heat is supplied from the heat storage unit to the heater to drive the exhaust heat recovery unit.

3. The exhaust heat recovery apparatus according to claim 2, further comprising:
a heat pipe that is provided between the heat storage unit and the exhaust heat recovery unit, and transmits the thermal energy in the heat storage unit to the heater.

4. An exhaust heat recovery apparatus, comprising:
an exhaust heat recovery unit that produces motive power by recovering thermal energy from exhaust gas discharged from a heat engine;
an electric generator that is driven by the exhaust heat recovery unit;
a first power transmission-switching device that switches between connection and disconnection between the heat engine and the exhaust heat recovery unit;
a second power transmission-switching device that switches between connection and disconnection between the exhaust heat recovery unit and the electric generator; and
a control section connected to the first power transmission-switching device and the second power transmission-switching device that controls the first power transmission-switching device and the second power transmission-switching device,
wherein the heat engine or the electric generator is selectively connected to the exhaust heat recovery unit, depending on operational status of the heat engine, and
wherein when the heat engine is neither in a decelerating state nor in a stopped state, and a vehicle requires the motive power from the exhaust heat recovery unit and the motive power from the heat engine to be combined and these motive powers to be output together, the first power-transmission-switching device is brought into a connected state, and the second power transmission-switching device is brought into a disconnected state.

5. The exhaust heat recovery apparatus according to claim 4, wherein, when the exhaust heat recovery unit does not apply a load to the heat engine, the first power transmission-switching device is brought into a connected state, and the second power transmission-switching device is brought into a disconnected state; on the other hand, when the exhaust heat recovery unit becomes a load to the heat engine, the first power transmission-switching device is brought into a disconnected state, and the second power transmission-switching is brought into a connected state.

6. The exhaust heat recovery apparatus according to claim 5, wherein,
when the heat engine is in steady operation, or when the heat engine is accelerating, if the increase in the rotation speed of the exhaust heat recovery unit follows the increase in the rotation speed of the heat engine, it is determined that the exhaust heat recovery unit does not apply a load to the heat engine, and therefore, the first and second power transmission-switching devices are brought into a connected state and a disconnected state, respectively.

7. The exhaust heat recovery apparatus according to claim 5, wherein,
when the heat engine is in steady operation, or when the heat engine is accelerating, if the increase in the rotation speed of the exhaust heat recovery unit lags behind the increase in the rotation speed of the heat engine, it is determined that the exhaust heat recovery unit becomes a load to the heat engine, and therefore, the first and second power transmission-switching devices are brought into a disconnected state and a connected state, respectively.

8. The exhaust heat recovery apparatus according to claim 4, further comprising:
a heat storage unit that stores heat obtained from exhaust gas of the heat engine, wherein,
if there is no request to drive the heat engine, and a temperature of a heater that the exhaust heat recovery unit includes to recover thermal energy becomes lower than the temperature of the heat storage unit, heat is supplied from the heat storage unit to the heater to drive the exhaust heat recovery unit.

9. The exhaust heat recovery apparatus according to claim 8, further comprising:
a heat pipe that is provided between the heat storage unit and the exhaust heat recovery unit, and transmits the thermal energy in the heat storage unit to the heater.

* * * * *